United States Patent [19]

Vancha

[11] Patent Number: 4,980,540

[45] Date of Patent: Dec. 25, 1990

[54] POSITIVE POWER-OFF CIRCUIT FOR ELECTRICAL APPLIANCES

[75] Inventor: John Vancha, Kewaskum, Wis.

[73] Assignee: The West Bend Company, West Bend, Wis.

[21] Appl. No.: 496,781

[22] Filed: Mar. 21, 1990

[51] Int. Cl.$^5$ ............................................. H05B 1/02
[52] U.S. Cl. ................................. 219/492; 219/493; 219/519; 219/508; 99/281
[58] Field of Search .............. 219/492, 493, 494, 497, 219/501, 505, 508, 509, 441, 364, 308–312, 306, 519; 99/280–284, 325, 329

[56] References Cited

U.S. PATENT DOCUMENTS

| | | | |
|---|---|---|---|
| 4,046,217 | 9/1977 | Magnuson | 180/126 |
| 4,245,148 | 1/1981 | Gisske et al. | 219/519 |
| 4,330,702 | 5/1982 | Cheng | 219/493 |
| 4,376,243 | 3/1983 | Renn et al. | 219/519 |
| 4,406,217 | 9/1983 | Oota | 99/280 |
| 4,418,614 | 12/1983 | Oota et al. | 99/280 |
| 4,547,657 | 10/1985 | Sticher, Jr. et al. | 219/493 |
| 4,566,802 | 1/1986 | Koehler | 99/283 |

Primary Examiner—M. H. Paschall
Attorney, Agent, or Firm—Dennison, Meserole, Pollack & Scheiner

[57] ABSTRACT

A power-off control circuit for a household appliance, including a manually operating momentary switch having conductive and non-conductive states. The switch is connected to a source of electric power so when the switch is momentarily manually operated into the conductive state, power flows into the power-off control circuit. There is a power regulator connected to the manually operating switch for receiving the power during the conductive state and for converting the received power into a voltage. A timer is connected to the power regulator and when activated, initiates a predetermined time period in which the household appliance operates. The circuit also includes a relay connected to the timer and the source of electrical power so as to be in parallel with the manually operating switch. The relay operates in a conductive and non-conductive state and is in the non-conductive state until receiving a signal from the timer at which time the relay changes to the conductive state. Now, the power regulator receives power through the relay until the relay changes to the non-conductive state and power is prevented from flowing through the power-off circuit.

5 Claims, 1 Drawing Sheet

POSITIVE POWER-OFF CIRCUIT FOR ELECTRICAL APPLIANCES

BACKGROUND OF THE INVENTION

This invention relates to circuitry for electric appliances and, more specifically, to an improved power shut-off circuit for an electric coffee maker.

In most drip brewing coffee makers, a timing circuit is initially enabled for a specified period of time. During this period, heated water flows into a container holding coffee grounds and, subsequently, brewed coffee drips into a carafe receptacle. A heating element beneath the receptacle keeps the brewed coffee hot during this time period. After the predetermined period of time has expired, power to the heating element is turned off.

Typical examples of such coffee makers with timing circuits for brewing coffee and maintaining the brewed coffee sufficiently hot during the predetermined period of time are found in the following patents.

U.S. Pat. No. 4,330,702 to Cheng discloses an off-the-shelf timer alarm clock integrated circuit implemented as an electric control device for a coffee maker. The timer circuit begins a "keep warm" cycle by initiating a fifty-nine minute drive signal to a semiconductor switching means such as a silicon controlled rectifier or SCR which in turn allows power to flow to a relay. The relay activates a heating element which heats the brewed coffee for the fifty-nine minute period or "keep warm" cycle. If the length of time for this cycle is insufficient, a D.C. power supply latches "on" the SCR, and the relay will remain activated for an indefinite period of time. The only way to turn Cheng's coffee maker off is to do it manually. Accordingly, there is no automatic shut off feature to prevent energizing or re-energizing of the coffee maker; the absence of such a feature is extremely dangerous because an activated or energized unattended coffee maker can cause an electrical malfunction which might lead to a fire.

U.S. Pat. Nos. 4,406,217 to Oota and 4,418,614 to Oota et al are somewhat similar to each other. Both patents disclose a coffee maker including a mill mechanism, a drip mechanism and a control device. Logic circuits of the control device are utilized to select a "regular" or "strong" flavored coffee. There exists a keep warm cycle somewhat similar to that employed in the Cheng patent. However, neither of the Oota patents discloses a positive disconnect means or method at the end of the warm cycle.

A disadvantage with these known timing circuits for electric coffee makers is that a disturbance in the supply line voltage such as a power surge, brown-out or lightning strike, can activate the timer circuitry and turn the appliance "on". This activation happens because these known timing circuits in electric coffee makers are not positively disconnected from the power line source unless the user manually unplugs or disconnects the power cord from the wall socket or power source.

U.S. Pat. No. 4,566,802 to Koehler recognizes a need to prevent energizing or reenergizing of the coffee maker during undesirable periods. In fact, the Koehler patent notes the concern of the Underwriters Laboratories with known coffee makers which repeatedly energize the coffee maker when left unattended. In an attempt to solve this problem of repeatedly activating the coffee maker, the Koehler patent discloses a twenty-four hour clock/controller utilizing an alarm inhibit circuit. The alarm inhibit circuit prevents the clock from recycling after a brewing cycle has initially been set. A cycle enable signal must be activated to re-start the brewing cycle. While no doubt exists as to the objective sought by the Koehler device, the circuitry suffers from a number of weakness which do not successfully prevent the re-energizing or activating of the coffee maker when the coffee maker is left unattended as expressed by the concern of the Underwriters Laboratories. For example, there are circumstances under which the Koehler device can be accidentally reactivated. Typically, because the device is not physically disconnected from the power line source, such as when the user manually unplugs the power cord, a severe lightning storm can cause electrical noise to be superimposed on the power lines and thus scramble the logic circuits of the Koehler device which will reactivate the brewing cycle. With the cycle activated, the coffee maker turns "on". Accordingly, because the Underwriters Laboratories are concerned with fires attributed to activated unattended coffee makers, the need still exists for a device which is de-energized such that any type of power line disturbance will not cause the circuitry in the device to reactivate the appliance.

SUMMARY OF THE INVENTION

It is the object of the invention to solve the problem of reactivating the timing circuitry and the heating element for a coffee maker or other household appliances.

Another object of the invention is to positively disconnect the timing circuitry and the heating element of the coffee maker from a line voltage.

A further object of the invention is to eliminate any possibility of the coffee maker or appliance from activating without the user first manually depressing a momentary switch.

These objects and others are implemented by an inventive feature which positively disconnects the line voltage power from the coffee maker or appliance. A power-off circuit for the electric coffee maker uses a relay circuit employing magnetically operated switch means and includes a timer chip wherein the power-off circuit controls the flow of current when closed after a start-up switch is momentarily pressed. Once the timer chip times out, the relay circuit drops out and the power-off circuit becomes positively disconnected from the power supplied to the line. If the user wishes to shut the electric coffee maker appliance off before the timer chip times out, a separate momentary switch can be depressed, and, acting as a shunt or a bypass branch in the power-off electric network, the momentary connection causes the current to bypass a diode bridge rectifier. The potential across the relay coil drops and the relay contacts open so that the flow of current through the power-off circuitry stops. Accordingly, the power to the circuit and the coffee maker appliance is completely and entirely disconnected.

These objects, together with other objects and advantages which will become subsequently apparent, reside in the details of construction and operation as more fully hereinafter described and claimed, reference being made to the accompanying drawings forming a part hereof, wherein like numerals refer to like parts throughout.

DESCRIPTION OF PREFERRED EMBODIMENT

Figure 1:
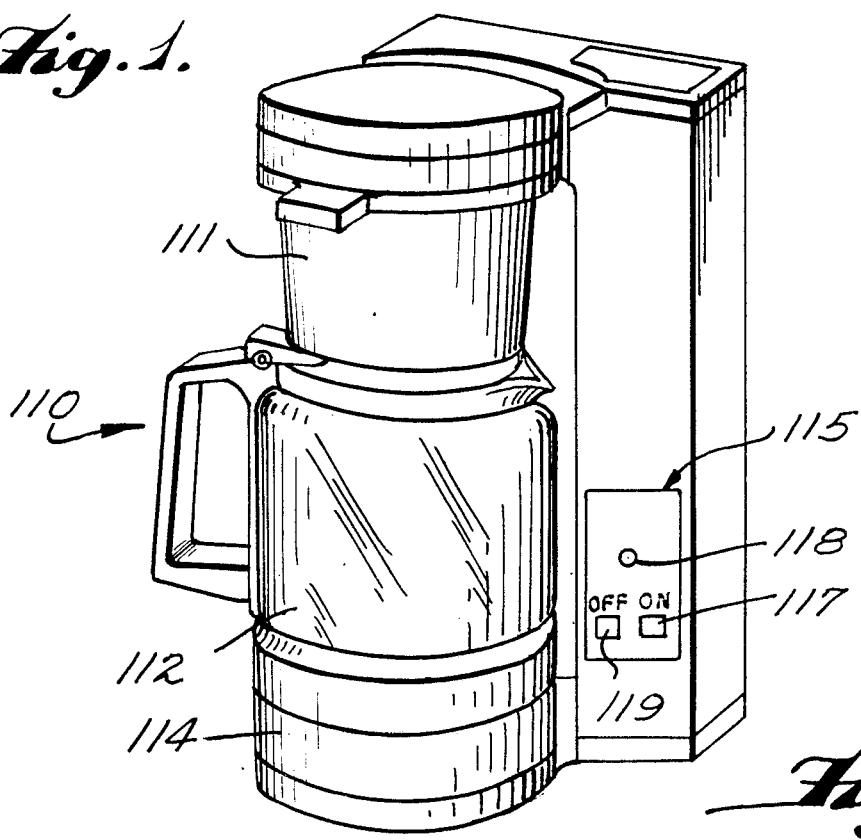
FIG. 1 is a perspective view of a coffee maker utilizing the positive power-off circuit of the present invention.

FIG. 1 illustrates a coffee maker 110 of essentially conventional design for illustrating the manner in which the present invention is employed. The coffee maker 110 includes a basket 111 which holds the coffee grounds and a carafe 112 for the brewed coffee after heated water flows through the basket 111. The figure also illustrates a heater 114 for keeping the coffee hot in the carafe 112, and an electronic timer 115. The electronic timer 115 has two momentary switches or buttons 117 and 119 for controlling the brewing time. Momentary switch 117 is employed for immediately beginning the brewing cycle for a predetermined time and momentary switch 119 is for turning the system off before the predetermined time has expired. Also, shown is an LED 118 for indicating the on/off status of the coffee maker 110.

Figure 2:
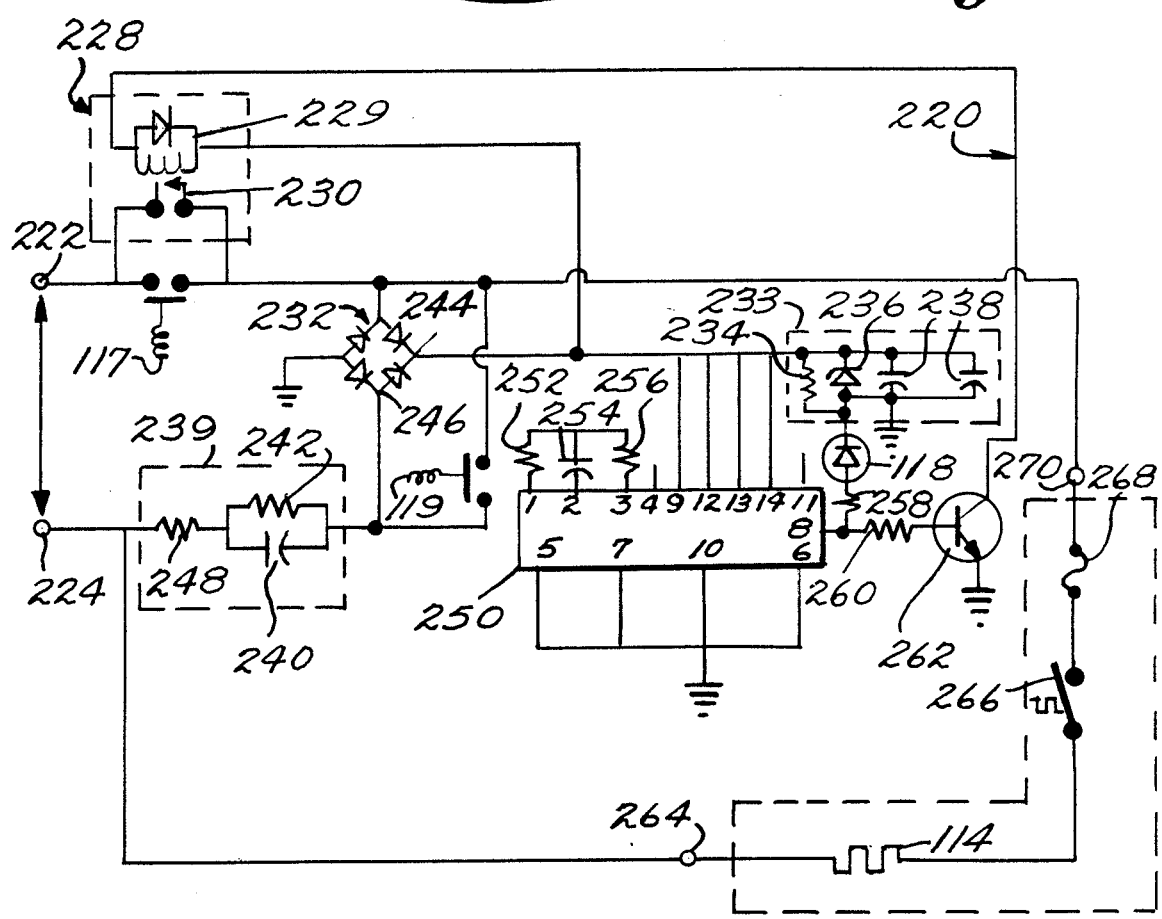
FIG. 2 is a schematic circuit diagram of a preferred embodiment of the invention.

FIG. 2 illustrates circuitry of the positive power disconnect auto shut-off device generally identified by the reference numeral 220. As shown, the arrangement is in the de-energized state or when absolutely no power is presently in the circuit.

Terminals 222, 224 are connected to an electrical cord (not shown) and the cord, in turn, is understood to be connected to a wall outlet (not shown). Connected in series with terminal 222 is first manually operated momentary or snap switch 117. Switch 117 is conventional in design and has two positions, the "off" position as is presently shown in the figure, and the "on" position. When switch 117 is momentarily closed, current flows into circuit 220. Immediately after making contact, switch 117 returns to the position shown in FIG. 2 and restores the open circuit.

Connected in parallel with switch 117 is a D.C. relay 228 having coil component 229 as well as contacts 230. Relay contacts 230 have a conductive and non-conductive state. Relay 228 is a common conventionally available component manufactured by Original Electric and having part number SRUDH-5-118DM. Unless relay 228 is energized or activated with power, relay contacts 230 remain non-conductive.

A full wave rectifying circuit 232 having four diodes is connected in series with switch 117. Rectifying circuit 232 changes the AC input voltage to a corresponding DC voltage. A circuit 233 comprising a 10K ohm resistor 234, a zener diode 236, and two 100 MFd capacitors 238 provides filtering and regulating of the DC voltage from rectifying circuit 232. A reactance voltage dropping circuit 239 has a capacitor 240 and a resistor 242 connected in parallel for receiving current from rectifying circuit 232. The two resistors 242 and 248 have values of 470K ohm and 22 ohm, respectively, and capacitor 240 has a value of 0.68 Mfd. Accordingly, during one half cycle current flows from output 244 to circuit 233 and during the other half cycle current flows from output 246 to circuit 239.

Timing chip 250 is a conventionally available timer manufactured by the Motorola Corporation and identified by part No. MC4541B. Pins 5, 7, 10 and 6 are tied to ground. Pin 1 is connected to a 470K ohm resistor 252, pin 2 is connected to a 0.22 MFd capacitor 254, and pin 3 is connected to a 1.0 Meg ohm resistor 256 with the opposite ends of the resistors 252, 256 and capacitor 254 connected together to form a circuit for determining a timing interval for the timer chip 250. Pin 9 is the Q/Q select, pins 12 and 13 are the input pins and pin 14 is a voltage pin for Vcc. Pins 4 and 11 are not used and pin 8 is the chip output. A 2.2K ohm resistor 258 is connected at one end to pin 8 and connected at the other end to LED 118 which is manufactured by Toshiba and has part No. TLR-147. The output of LED 118 is connected to the filtering and regulating circuit 233.

When the LED 118 is on, the timer chip 250 is operating for the timing interval. Also connected to output pin 8 is a 10K ohm resistor 260 which is connected to a transistor 262. The transistor 262 is an off-the-shelf component with part No. 2N4124. The emitter of the transistor 262 is tied to ground and the collector is connected to relay 228.

Resistor 248 from the reactance voltage dropping circuit 239 is connected to terminal 224 of the 120VAC power source and also to terminal 264. Terminal 264 connects the drip assembly with heater 114, thermostat 266 and a fuse 268 of the appliance 110 to the circuit 220 by way of terminal 270. It will be understood that the drip assembly operates as is conventionally known in the art wherein the thermostat 266 is employed to control the heater 114 so as to keep the brewed coffee sufficiently hot.

A second manually operated momentary switch 119 is shown connected in parallel with rectifying circuit 232. Switch 119 is momentarily closed when one desires to turn the appliance 110 "off" before the predetermined time period has expired. After switch 119 closes, it immediately returns to the position shown in FIG. 2 and restores the open circuit. Switch 119 connects at one end to input terminal 222 after switch 117 and at the other end to terminal 224 by way of circuitry 239. As is similar to switch 117, and as illustrated, the rest state of switch 119 is "OFF". In this position or state, no current flows through switch 119.

With the arrangement of the components of circuit 220 now set forth, the operation of the circuitry will be discussed with reference to FIG. 2.

In operation, manual switch 117 is momentarily closed and power is supplied to the circuit 220 by way of terminals 222, 224. Immediately after power enters the circuit 220, switch 117 returns to the open position. The terminals 222 and 224 are connected to the conventional 120 volt household power source. The alternating current or AC voltage is sinusoidal and, accordingly, the power supply circuitry consists of the reactance voltage dropping circuit 239. The sine wave is rectified by the full wave rectify circuit 232 which converts the AC sine wave voltage to a corresponding DC voltage as is known in the art. It will be noted that the use of this full wave rectifying circuit 232 does not require a center-tapped transformer. The four diodes, in bridge formation, are used with two of the four diodes conducting during the first half wave cycle and the other two diodes conducting during the subsequent half way cycle. After the AC voltage has been converted to the DC voltage, zener diode 236 regulates the voltage and the two capacitors identified by numeral 238 perform a filtering function.

To initiate timer chip 250, a voltage to pin 14 is required. The timer chip 250 is provided with a two hour time out by way of the values selected for capacitor 254 and resistors 252, 256. Of course, other timing intervals are available by merely changing any one of the values for capacitor 254 and resistors 252, 256.

With the timing cycle started, current continues to flow through the circuitry turning relay coil 229 "on". The relay contact 230 will short switch 117 and provide continuous current to circuit 220 as well as to appliance 110. In the preferred embodiment, appliance 110 is a coffee maker with a heater 114 and drip assembly.

When power is supplied to the heater 114 as hereinabove described, the drip assembly supplies hot water for the basket 111 and carafe 112. A thermostat switch 266 having a normal conductive and non-conductive state is shown, as is thermal fuse 268 which provides a necessary safety precaution.

At the end of the timing cycle, timer 250 stops supplying current to transistor 262. In this digital application, the transistor 262 functions as a simple switch. Accordingly, when current is flowing through the circuit 220, transistor 262 is saturated with both the emitter-base and collector-base junctions forward biased. In this very low impedance state of the collector-emitter junction, all three terminals are at about the same potential and current freely flows through transistor 262 to the relay 228 as well as through the circuit 220. However, when timer 250 subsequently times out and stops supplying current to transistor 262, the transistor 262 switches "off" or to a very high impedance state with both junctions being reverse biased. Current thus ceases to flow to relay circuit 228. When no current is flowing to relay circuit 228, the relay contacts 230 open and the circuit 220, as well as the appliance 110, are disconnected from the power terminals 222, 224.

Accordingly, because circuit 220 is deenergized, and completely disconnected from the household power supply, any type of power line disturbance cannot cause circuit 220 to reactivate. In fact, no current flows through or into circuit 220 until switch 117 is again momentarily operated to couple the circuit 220 to the power line voltage.

Another feature of the preferred embodiment is exemplified by switch 119 during periods when it functions as a shunt circuit. That is, at any time during the timing period, switch 119 can be momentarily closed. The closing of switch 119 causes the relay 228 to drop out by allowing the current flow to bypass full wave rectifying circuit 232 which causes the potential across relay coil 229 to drop and relay contacts 230 to "open". Accordingly, switch 119 allows the user to interrupt and thus shut the entire unit "off" before the timing cycle expires.

The foregoing is considered illustrative only of the principles of the invention. Further, since numerous modifications and changes will readily occur to those skilled in the art, it is not desired to limit the invention to the exact construction and operation as shown and described. For example, any household appliance could be implemented with the power shut off circuit 220, and, merely because the present disclosure is illustrated in connection with electric coffee makers, no intention exists to restrict the present invention to coffee makers in general. Accordingly, all suitable modifications and equivalents may be resorted so as to fall within the scope of the invention which is intended to be limited only by the scope of the appended claims.

I claim:

1. A power-off control circuit for an electric appliance, comprising:
    manually operating momentary switch means having conductive and non-conductive states, said switch means connected to a source of electric power and momentarily manually operating in said conductive state for permitting power to flow into said power-off control circuit;
    power regulating means connected to said manually operating switch means for receiving the power during said momentarily conductive state of said switch means and for converting the received power to a voltage;
    timer means connected to said power regulating means and activated by said voltage, said timer means initiating a predetermined time period for operating the appliance and said timer means outputting a signal at the start of the predetermined time period; and
    a relay circuit including relay contacts, said relay circuit connected to said timer means, the source of electrical power and in parallel with said manually operating switch means, said relay contacts having conductive and non-conductive states and operating in said non-conductive state until said switch means momentarily operates in said conductive state and permits power to flow into said power-off control circuit, said relay circuit receiving said signal from said timer means at which time said relay contacts change to said conductive state with said power regulating means receiving the power through said relay circuit, and at the end of the predetermined time period said relay contacts changing to said non-conductive state and the power to said power-off control circuit positively disconnects.

2. The power-off control circuit as recited in claim 1, and further including a transistor connected between said timer means and said relay circuit, said transistor having conductive and non-conductive states for changing the states of said relay contacts based on said signal received from said timer means so when said transistor is in said conductive state said relay contacts are subsequently in said conductive state and when said transistor is in said non-conductive state said relay contacts switch to said non-conductive state.

3. The power-off control circuit as recited in claim 1, wherein said power regulating means includes a rectifying circuit and reactance voltage dropping means for converting the received power into a D.C. voltage.

4. The power-off control circuit as recited in claim 3, wherein said rectifying circuit is a full wave rectifying circuit.

5. The power-off control circuit as recited in claim 1, wherein said electric appliance is a coffee maker with a brewing assembly and a heating coil.

* * * * *